United States Patent [19]

Stecklen et al.

[11] 3,719,646

[45] March 6, 1973

[54] METHOD OF PREPARING AQUEOUS EMULSION POLYMERS FROM MONOMERS CONTAINING AN AZIRIDINE RING

[75] Inventors: Robert Stecklen, Baltimore; Fred Robinson, Columbia, both of Md.

[73] Assignee: Alcolac Chemical Corporation, Baltimore, Md.

[22] Filed: April 9, 1971

[21] Appl. No.: 132,916

[52] U.S. Cl........260/80.72, 260/29.6 HN, 260/79.7, 260/86.1 N, 260/17 R, 117/161 C, 117/161 UN
[51] Int. Cl..............................C08f 15/40, C08f 1/60
[58] Field of Search .....260/80.72, 86 N, 197, 78.5 R

[56] References Cited

UNITED STATES PATENTS 2,655,494  10/1953  Kropa et al..........................260/77.5
3,448,094  6/1969  Zief et al. ..........................260/86.1

Primary Examiner—James A. Seidleck
Assistant Examiner—Stanford M. Levin
Attorney—Henry B. Kellog

[57] ABSTRACT

An emulsion polymer, the films of which have exceptional wet adhesion to painted substrates, is prepared by polymerizing an aqueous dispersion of either an acrylic acid ester or a methacrylic acid ester or a mixture thereof with an aqueous solution of an aziridinyl monomer previously neutralized with an acid whose PKa value is 3.7 or less, at a temperature of from 40° to 55° C., in the presence of a free radical type catalyst and preferably in the absence of air. Ordinarily, the pH of the said aqueous acid solution will be between 2 and 5, but this is not the significant factor in comparison with the PKa value. If the unneutralized aziridinyl polymer, i.e., copolymer or terpolymer, is desired, it can be liberated by treatment of the polymer with ion exchange resins, or alkali.

7 Claims, No Drawings

METHOD OF PREPARING AQUEOUS EMULSION POLYMERS FROM MONOMERS CONTAINING AN AZIRIDINE RING

This invention relates to a new method of preparing latex polymers of aziridine containing monomers the films of which have excellent wet adhesion to oleoresinous or alkyd resin surfaces. By the term "wet adhesion" as employed herein is meant the phenomenon that is displayed wherein the bond at the interphase of the substrate and the oleoresinous or alkyd film when in prolonged contact with water fails, whereas the bond between the oleoresinous or alkyd film surface and the film of the polymer prepared from the aziridinyl monomer remains intact.

It is well known that the presence of aziridine functionality (aziridine rings) in a polymer contributes excellent adhesion to various substrates. Acrylic copolymers containing small amounts of aziridinyl ethyl methacrylate are extensively used in automotive finishes as adhesion promoters. These copolymers, however, must be prepared in organic systems, i.e., in the absence of water. This is due to the fact that under the conditions normally employed in emulsion or suspension copolymerization, the water present will rapidly open the aziridine ring and lead to highly cross-linked polymers which do not have any flow properties and which do not possess the desired adhesive properties. Therefore, it has been generally assumed in the polymer art that copolymers of aziridinyl ethyl methacrylate must be prepared in anhydrous systems. This assumption is based on the observation that monomeric aziridinyl ethyl methacrylate is notoriously unstable in the presence of water. A 5 percent solution at room temperature begins to cloud after a few minutes and eventually deposits a water insoluble product. The nature of the aziridinyl ethyl methacrylate molecule suggests that hydrolysis and/or polymerization occur.

The high water solubility of the monomer and its instability therein posed serious draw-backs to its copolymerization with other monomers in aqueous emulsion systems. The untoward side reactions result in loss of functionality and have seriously hampered efforts to prepare desired polymers in aqueous systems. Films formed from emulsion polymers prepared by conventional techniques are highly cross-linked and hence are less effective as pigment binders and the like because anticipated adhesion promoting properties contributed by the aziridinyl monomer are diminuted.

To meet commercial requirements for latex polymers containing aziridinyl monomers whose films can be applied to old paint surfaces with excellent wet adhesion constitutes the principal object of the present invention.

Other objects and advantages will become more clearly apparent from the following description.

We have found a method of protecting the aziridinyl functionality during aqueous polymerization reactions without opening the aziridine ring and without leading to cross-linked polymers. Surprisingly and unexpectedly, we found that monomers containing a three-membered aziridine ring can be stabilized in aqueous polymerization systems alone or with other comonomers by the addition of one equivalent of a water soluble inorganic or organic acid to the aqueous system so as to give a PKa value of 3,7 or less, preferably in the range of 1.5 to 3.0. After copolymerization at a temperature in the range of from 0° to 90° C., preferably from 40° to 55° C., for a period of time ranging from 1 to 16 hours, a latex polymer is obtained which provides the valuable properties of adhesion promotion, and films cast from such aqueous systems show the very valuable property of "wet adhesion" to oleoresinous or alkyd films. This means that the latex films can be applied directly to old oil paint surfaces without the need of a pre-coat of a primer paint.

While our method stabilizes the aziridine ring or group during the polymerization reaction, it does not eliminate the reactivity in subsequently heat cured systems and the copolymers obtained can be cross-linked with other polymers at elevated temperatures in the conventional manner. The stability, however, in the absence of cross-linking agents is greatly improved.

The further surprising and unexpected feature of the present invention is that the resultant latex polymers are substantially linear, with little or negligible cross-linking, and as a consequence contribute to the excellent wet adhesion to old painted surfaces.

The aziridinyl monomers that are homopolymerized or copolymerized with other monomers in accordance with the present invention are characterized by the following formulas:

(1) 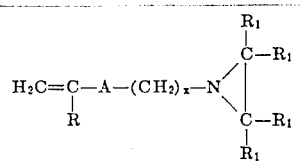

wherein R is either hydrogen or methyl, each $R_1$, which may be the same or different, is hydrogen or a lower alkyl group of from one to four carbon atoms, e.g., methyl, ethyl, n-propyl, i-propyl, n-butyl, i-butyl, sec.-butyl and t-butyl, A is either a

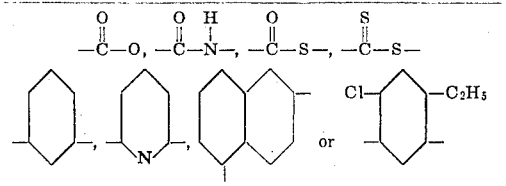

group, and $x$ is a numeral ranging from 2 to 6 and therefore represents an ethylene, propylene, butylene, pentylene or hexylene group, and (2) 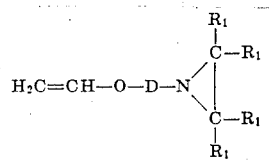

wherein D is either a

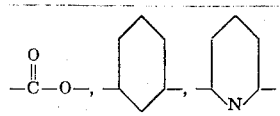

or a $(CH_2)_x$ group in which $x$ has the same numerical value as in formula (1). $R_1$ also has the same value as in formula (1).

As illustrative examples of the aziridinyl monomers conforming to the foregoing formulas the following may be mentioned:

2-(1-aziridinyl) ethyl acrylate
2-(1-aziridinyl) ethyl methacrylate

2-[1-(2) methyl aziridinyl] ethyl methacrylate
2-[1-(2,3) dimethyl aziridinyl] ethyl methacrylate
2(1-aziridinyl) propyl methacrylate
3(1-aziridinyl) propyl methacrylate
2[1-(2-butyl) aziridinyl] ethyl methacrylate
2[1-(2-phenyl) aziridinyl] ethyl methacrylate
3-(1-aziridinyl) propyl acrylate
3-(1-aziridinyl) propyl methacrylate
4-(1-aziridinyl) butyl acrylate
4-(1-aziridinyl) butyl methacrylate
N-2-(1-aziridinyl) ethyl methacrylamide
p-2 (1-aziridinyl) ethyl styrene
2-vinyl-5-[2(1-aziridinyl)] ethyl pyridine
2-vinyl-4-[1-(2-ethyl) aziridinyl] ethyl pyridine
2-vinyl-5-[2(1-aziridinyl)] propyl naphthalene
2-chloro-3-ethyl-5-[2(1-aziridinyl)] butyl styrene
S-2-(1-aziridinyl) ethyl thio acrylate
S-2-(1-aziridinyl) ethyl thio methacrylate
S-2-(1-aziridinyl) propyl thio methacrylate
S-3-(1-aziridinyl) propyl thio acrylate
2-(1-aziridinyl) ethyl dithio methacrylate
2-(1-aziridinyl) propyl dithio acrylate
3-(1-aziridinyl) propyl dithio methacrylate
ethyl-2-(1-aziridinyl) ethyl hydrogen aconitate
diethyl-2-(1-aziridinyl) ethyl aconitate
vinyl-2-(1-aziridinyl) ethyl ether
2-(1-aziridinyl) vinyl propionate
3-(1-aziridinyl) vinyl butyrate
2-(1 aziridinyl) vinyl butyrate
P-[2-(1-aziridinyl) ethyl] phenyl vinyl ether
[2-methyl-2-(1-aziridinyl)propyl] phenyl vinyl ether
4-vinyloxy, 2-(1-aziridinyl) ethyl pyridine The aziridinyl monomers of formulas (1) and (2) are prepared by methods well known in the art. One of such methods consists of an ester interchange reaction between an ester of an alpha monoethylenically unsaturated carboxylic acid and a (1-aziridinyl) alkanol of from two to six or more carbon atoms in the presence of an alkali metal alkoxide catalyst such as sodium methoxide or an alkali metal aziridinyl alkoxide such as sodium-2-(1-aziridinyl) ethoxide.

The (1-aziridinyl) alkanols employed in the ester interchange include: 2-(1-aziridinyl)-ethanol; 2-(1-aziridinyl)-1-propanol; 2-(2,3-dimethyl-1-aziridinyl)-1-butanol; 2(2,2-diethyl-1-aziridinyl)-ethanol; 2-(2-n-butyl-1-aziridinyl)- ethanol; 1-(2-methyl-3-ethyl-1-aziridinyl)-2-butanol and 1-(1-aziridinyl)-2-hexanol. These and other (1-aziridinyl)-alkanols may be prepared by reacting aziridine or an alkyl-substituted aziridine compound with an epoxyalkane. A suitable method of preparation is disclosed in U.S. Pat. No. 2,475,068 to Wilson the teachings of which are incorporated herein by reference.

The esters of alpha unsaturated carboxylic acids include the various acrylates and methacrylates hereinafter listed, various alkyl and aryl esters of acrylic acid, methacrylic acid, vinyl acetic acid, allylacetic acid, alpha-ethylacrylic acid and undecylenic acid.

For reasons of economy (price per lb.) and ease of preparation, we prefer to employ methyl or ethyl acrylates, or methyl or ethyl methacrylates, with 2-(1-aziridinyl)-ethanol in the ester interchange reaction. Not only that, but the 2-(1-aziridinyl) ethyl acrylate and methacrylate are becoming commercially available. It is to be understood, however that in addition to the aziridinyl monomers of formulas (1) and (2) any alpha monoethylenically unsaturated compound containing the following aziridine group in its molecular configuration may be effectively employed for the purpose of the present invention:

(3) 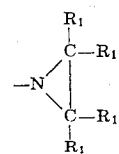

wherein $R_1$ have the same values as in formulas (1) and (2).

The monomers that may be copolymerized with the foregoing aziridinyl monomers of formulas (1) and (2) include hydroxyalkyl vinyl ethers and sulfides in which the hydroxyalkyl groups contain from two to 18 carbon atoms, such as $\beta$-hydroxyethyl vinyl ether, 8-hydroxyoctyl vinyl ether, $\beta$-hydroxyethyl vinyl sulfide, 18-hydroxyoctadecyl vinyl sulfide, hydroxyl-containing esters of alpha, beta-monoethyleneically acid in which the hydroxy group may be in the acid or the alcoholic moiety of the ester or in both such moieties. The monoethylenically unsaturated acid from which the ester is derived may be mono-carboxylic or polycarboxylic which include acrylic, methacrylic, itaconic, maleic, fumaric, crotonic, alpha-hydroxy-alkyl-acrylic, aconitic, citraconic, alpha-acryloxyacetic, alpha-methacryloxypropionic, etc., including the various monomers specifically disclosed in columns four to nine inclusive of U.S. Pat. No. 3,356,627 which disclosed monomers are incorporated into the instant specification by reference to said patent.

As examples of acrylate and methacrylate esters that are preferably copolymerized with the aziridinyl monomers of formulas (1) and (2), and also employed in the ester interchange as noted hereinbefore, the following are illustrative:

ACRYLATE

| | |
|---|---|
| Methyl | Heptyl |
| Ethyl | 2-heptyl |
| Propyl | Octyl |
| Isopropyl | 2-octyl |
| Butyl | Nonyl |
| Isobutyl | 5-ethyl-s-nonyl |
| s-Butyl | Decyl |
| 2-methyl-1-butyl | 2-methyl-7-ethyl-4-undecyl |
| 3-methyl-1-butyl | Dodecyl |
| 2-ethyl-1-butyl | Tetradecyl |
| Amyl | Hexadecyl |
| 3-pentyl | Octadecyl |
| 2-methyl-1-pentyl | 2-methoxyethyl |
| 4-methyl-2-pentyl | 2-ethoxyethyl |
| Hexyl | 2-butoxyethyl |
| 2-ethylhexyl | Phenyl |

METHACRYLATE

| | |
|---|---|
| Methyl | $\beta$-phenoxyethyl |
| Isobutyl | $\beta$-phenylethyl |
| Isoamyl | Phenyl |
| Cyclohexyl | o-cresyl |
| $\beta$-methoxyethyl | p-cyclohexylphenyl |

In the copolymerization reaction, 80 to 99.9 percent by weight of anyone of the above illustrated acrylates or methacrylates, which are preferred, or anyone of the monomers referred to above including those disclosed in U.S. Pat. No. 3,356,627, is employed per 0.1 to 20 percent by weight of the aziridinyl monomer of formula (1) or (2).

In practicing the preferred embodiment of the present invention, an acid salt of the aziridinyl monomer of formula (1) or (2) is first prepared by mixing the monomer with distilled water and then adding any organic or inorganic acid that has a Pka value of less than about 3.7 and preferably in the range of 1.5 to 3.0. The Pka is defined as the negative logarithm of the ionization constant of the acid at 25° C. in water. For example, the ionization constant of acetic acid at 25° C. is given as $1.753 \times 10^{-5}$. Its PKa is 4.756. If an acid is so constructed that more than one proton can ionize in water, the ionization constant of each proton is given with the appropriate subscript. Thus, sulfurous acid would have $PK_1$ and $PK_2$ values of 1.77 and 7.20, respectively.

The acids that are effective have at least one proton which ionizes sufficiently in water to provide the acid with a PK of less than 3.7 and preferably less than 3.0. The acids covered under the scope of this invention include: oxalic, fumaric, maleic, malonic, citric, tartaric, isethionic, dodecyl sulfonic, phthalic, picric, benzene sulfonic acid, toluene sulfonic, pyromucic, α-chloroacetic, a,a-dibromo or dichloro propionic, sulfuric, sulfurous, ortho phosphoric, pyrophosphoric, hypo-phosphoric, nitric, periodic acid, and the like.

As a simple expedient without determining the PKa values, anyone of the above mentioned acids, which are merely illustrative, may be added in sufficient quantity so as to give a pH of 2 to 5 to the resulting solution. The latter solution is set aside and labeled as charge B (stabilized aziridine solution).

A kettle charge labeled A is then prepared by dissolving in distilled water anyone of the peroxygen type catalysts conventionally employed in emulsion polymerization such as hydrogen peroxide, sodium perborate, potassium perphosphate, ammonium persulfate, potassium persulfate, urea peroxide, sodium percarbonate, and the like, preferably together with an alkali metal hydrosulfite as accelerator which may also be added separately as charge D. The amount of catalyst employed may range from 0.05 to 5 percent by weight based on the weight of the total charge of monomers being polymerized. The amount of alkali metal hydrosulfite ranges from 0.01 to 1.0 percent by weight based on the weight of the total charge of monomers. If desired, from 0.025 to 10.0 percent by weight based on the weight of the total charge of monomers of any surfactant concoventionally employed in emulsion polymerization, as an emulsifier, may be added to this charge.

A pre-emulsion of either the acrylate ester or methacrylate ester, preferably a mixture of these two esters as above defined is prepared by intimate mixing in water the mixture of esters and a surfactant which will function as emulsifying agent. The amount of the latter may be in the same range as given for charge A. The pre-emulsion is labeled as charge C.

The last charge, labeled E, consists of sodium metabisulfite ($Na_2S_2O_5$) as a 5 percent aqueous solution. This solution functions as a redox agent, and is employed in an amount of about 0.05 to 1.0 percent by weight based on the weight of the monomers employed.

The surfactants that may be employed as emulsifiers in Charge A and C consist of anyone of the commercially available non-ionic, cationic or anionic surfactants, or compatible mixtures thereof. The surfactants that may be employed include the condensation products of fatty alcohols or alkylated phenols with ethylene oxide, polyethylene glycols, glycols and polyglycol ethers of isocyclic hydroxy compounds, numerous species of which are disclosed in U.S. Pat. No. 2,213,447; ethoxylated di-alkyl phenols, many species of which are illustrated in U.S. Pat. No. 2,593,112; water soluble ethoxylated alcohols, ethoxylated carboxylic acids and amino compounds of the type disclosed in U.S. Pat. No. 1,970,578. Other surfactants usable are well known to those skilled in the art.

Of the non-ionics, we prefer to employ the condensation product of either octyl phenol or dodecyl phenol with 40 moles of ethylene oxide because they are readily available and price-wise more economical.

The amount of water employed in preparing charges A to C is not critical and may range from 25 to 85 percent by weight based on the total weight of the total formula.

The polymerization reaction is preferably carried out in the absence of air, i.e., under a blanket of nitrogen, at a temperature preferably in the range of 40°–55° C. for a period of time ranging from 1 to 16 hours.

The following examples will show how the polymers of the present invention are prepared. All parts given are by weight unless otherwise noted.

EXAMPLE I

The purpose of this example is to employ the conventional emulsion copolymerization of an aziridinyl monomer with other monomers without first protecting, i.e., stabilizing, the aziridinyl ring and to observe the wet adhesion of the film deposited from the resulting dispersion.

CHARGE (A)

(Kettle Charge)

| Ingredient | Amount in grams |
|---|---|
| Water (tap) | 277 |
| Triton X405 (condensation product of one mole of octyl phenol with 40 moles of ethylene oxide) | 11.85 |
| Potassium persulfate | 0.60 |
| Sodium bicarbonate | 0.25 |

CHARGE (C)

(Pre-emulsion)

| | |
|---|---|
| Ethyl acrylate | 165 |
| Methyl methacrylate | 82.5 |
| 21(1-aziridinyl) ethyl methacrylate | 2.5 |
| Water (tap) | 41.7 |
| Triton X405 | 11.35 |

CHARGE (D)

| | |
|---|---|
| Sodium hydrosulphite (5% solution) | 7.5 |

CHARGE (E)

| | |
|---|---|
| Sodium metabisulfite (5% solution) | 25.0 |

Kettle charge (A) is added to room temperature (under a nitrogen blanket) to a 1-liter reaction vessel equipped with agitation, nitrogen inlet, thermometer and condenser. Approximately one-third of the pre-emulsion (Charge C) is added followed by Charge (D) and after a brief induction period, a gradual exotherm is noted. The exotherm is allowed to reach 36° C., where upon Charge (C) and (E) are simultaneously added so as to increase the reaction temperature to 50 ± 2° C. The reaction required about 2 hours to reach 50° C. and an additional hour at about the same temperature to complete the copolymerization reaction. A stable dispersion was obtained of about 40.7 percent solids and a pH of 7.4. This is Sample I.

EXAMPLE II

Essentially the same procedure is used as in Example 1 except that the amount of the 2-(1-aziridinyl) ethyl methacrylate is doubled. The aziridine ring of the latter is still unprotected, i.e., not stabilized. The resulting solids are 38.7 percent. The final pH is 6.7. This is sample II.

EXAMPLE III

In this example the aziridinyl monomer is protected, i.e., stabilized at a pH of 4.25.

CHARGE (A)

(Kettle charge)

| Ingredient | Amount in grams |
|---|---|
| Water (Distilled) | 83.0 |
| Triton X405 | 2.1 |
| Potassium persulfate | 0.60 |
| Sodium hydrosulfite (5% solution) | 7.5 |

CHARGE (B)

(Stabilized aziridine solution)

| | | |
|---|---|---|
| Water (Distilled) | 250 | |
| Ortho phosphoric acid (85%) | 3.8 | pH-4.25 |
| 2-(1-aziridinyl) ethyl methacrylate | 5.0 | |

CHARGE (C)

(Pre-emulsion)

| | |
|---|---|
| Water | 76 |
| Triton X405 | 19.3 |
| Ethyl acrylate | 165.0 |
| Methyl methacrylate | 80.0 |

CHARGE (E)

| | |
|---|---|
| Sodium metabisulfite (5% solution) | 25.0 |

To charge A in the kettle is added one-third of Charges B and C at room temperature. The reaction temperature is allowed to rise exothermically to 47–49° C. and the balance of charges B and C is added sumultaneously and continuously together with charge E while keeping the batch temperature at 47–49° C. The final solids are 37.0 percent and the resultant dispersion has a pH of 3.15 and labeled as Sample III.

EXAMPLE IV

Same as Example III except 1.0 equivalent of conc. sulfuric acid (0.80 grams) per mole of aziridinyl ethyl metacrylate is substituted for the ortho phosphoric acid. Final solids are 37.9 percent and the pH is 2.75. This is sample IV.

EXAMPLE V

CHARGE (A)

(Kettle charge)

| Ingredient | Amount in grams |
|---|---|
| Water (Distilled) | 300 |
| Potassium persulfate | 1.2 |
| Sodium hydrosulfite 5% solution | 7.5 |

CHARGE (B)

(Stabilized aziridine solution)

| | | |
|---|---|---|
| 2-(1-aziridinyl) ethyl methacrylate | 10 | |
| Methacrylic acid | 5.5 | pH - 6.75 |
| Water | 100 | |

CHARGE (C)

(Pre-emulsion)

| Ingredient | |
|---|---|
| Water | 146 |
| Triton X405 | 42.8 |
| Ethyl acrylate | 330 |
| Methyl methacrylate | 160 |

CHARGE (E)

| | |
|---|---|
| Sodium metabisulfite (5% solution) | 50 |

The polymerization procedure is the same as that in Example IV. The methacrylic acid used in this example is considerably less effective in stabilizing the 2-(1-aziridinyl) ethyl methacrylate solution as some clouding will occur before addition is complete. The final latex solids were 41.8 percent and the final pH was 4.9. This is Sample V.

EXAMPLE VI

CHARGE (A)

(Kettle charge)

| | |
|---|---|
| Water (Distilled) | 300 |
| Potassium persulfate | 1.2 |
| Sodium hydrosulfite (5% solution) | 15.0 |

CHARGE (B)

(Stabilized aziridine solution)

| | | |
|---|---|---|
| Water (Distilled) | 100 | |
| 2-(1-aziridinyl) ethyl methacrylate | 10 | pH-4.45 |
| Phosphoric acid (85%) | 7.4 | |

CHARGE (C)

(Pre-emulsion)

| | |
|---|---|
| Water (Distilled) | 146 |
| Triton X405 | 42.8 |
| Ethyl acrylate | 330 |
| Methyl methacrylate | 160 |

CHARGE (E)

| | |
|---|---|
| Sodium metabisulfite (5% solution) | 50 |

Polymerization procedure is the same as Example V. The resulting dispersion had 43.6 percent solids and a pH of 3.0. This is Sample VI.

Evidence of decreased cross linking can be found from equilibrium swelling ratios of films formed from the herein described dispersions. Toluene, a known solvent for acrylates and metacrylates was used as the solvent. To avoid fortuitous reduction swelling ratio induced by the presence of salts in the polymeric backbone, samples were also deionized using a mixed bed resin (MB-I, a mixture of cationic and anionic ion exchange resin beads, manufactured and sold by Rohm & Haas Co., Philadelphia, Pa.) and again checked for swell ratio.

The ratios described were calculated as follows based on the method described by Paul J. Flory, Principles of Polymer Chemistry, pages 577–593.

let $V_o$ = Initial film volume
$V_1$ = Volume dissolved by the solvent
$V_s$ = Volume of solvent absorbed
$V_f$ = Final volume = $(V_o - V_1) + V_s$ swelling ratio =

$$\frac{X_f}{X_0 - X_1}$$

Films of 30 mil dry film thickness were prepared by weighing the corresponding amount of emulsion into Petri dishes and allowing to air dry for 7 days. The dry films were removed from the dish, specimen cut and weighed accurately, and emersed for 72 hours in toluene. The percent weight due to absorption of toluene is shown in table 1 as "swelling ratio."

TABLE I

Swelling Ratios of Films Deposited from Samples I through VI in Toluene

| Sample | Weight % Aziridinyl Ethyl Methacrylate in copolymer | Swelling Ratio |
|---|---|---|
| I | 1.0 | 5.7 |
| II | 2.0 | 3.5 |
| III | 2.0 | 30.0 |
| IV | 2.0 | 28.0 |
| V | 2.0 | 9.0 |
| VI | 2.0 | 19.7 |

50cc. samples of copolymer samples 1 6 were passed at a rate of 1 cc. per minute, through a half-inch diameter column containing 30 cc. of Amberlite MB—3 (a blend of cationic and anionic ion exchange resins available from Rohm & Haas Company). Approximately 45 cc. were recovered. By this treatment, any inorganic salts as well as any acids used in stabilizing or neutralizing the aziridine copolymer were converted into the free imine form. 30 mil dry thickness films were prepared as above and specimens emersed in toluene for 72 hours. The values for swelling ratio that were obtained are shown in Table II.

TABLE II

Swelling Ratios of Films Deposited from de-ionized Samples I through VI in Toluene.

| Sample Number | Resistivity of Dispersion (ohms) | Swelling Ratio |
|---|---|---|
| I | 100,000 | 5.0 |
| II | 50,000 | 5.1 |
| III | 1,920 | 34.0 |
| IV | 7,300 | 29.3 |
| V | 13,800 | 10.5 |
| VI | 18,000 | 25.0 |

The polymeric dispersions of Samples 1 to 6 of this invention were used to prepare pigmented latex paint formulations according to the following formulation.

| Material | Parts by Weight |
|---|---|
| Water | 118.9 |
| Commercial dispersant, sodium salt of maleic—diisobutylene copolymer 1:1 mole ratio, 25% solution in water (Tamol 731, Rohm & Haas) | 9.32 |
| Potassium tripolyphosphate | 0.93 |
| Low foam nonionic surfactant (Triton CF—10, Rohm & Haas) | 1.86 |
| Defoamer (Nopco NDW) | 0.93 |
| Hydroxyethyl cellulose (Union Carbide) 2.5% aqueous solution | 50.0 |
| Hexylene glycol | 27.97 |
| Ethylene glycol | 23.31 |
| Rutile titanium dioxide (Ti-Pure R—901 DuPont) | 256.41 |
| Hi brightness clay (Opti-White) | 163.17 |
| Ignited diactomaceous earth (Olite 281, Johns Manville) | 46.62 |
| Silica | 37.29 |

The foregoing formulation was ground on a high speed disperser for 10 minutes. Six of such formulations were prepared, one for each of Samples I to VI. To each of the formulations the following were added at a low speed of agitation

| Material | Parts by Weight |
|---|---|
| Polymeric dispersion sample (I to VI) corrected to 47% solids | 279.72 |
| Defoamer(Nopco NDW) | 0.93 |
| VM&P Naptha | 0.93 |
| 2.5% Hydroxyethyl cellulose aqueous solution | 85.08 |
| Water | 82.75 |
| Adjust pH to 9.5 with ammonium hydroxide | |

The six finished paints were separately painted onto a substrate coated with a 1 mil dry film of a conventional gloss alkyd paint previously air dried for 7 days at room temperature and checked for wet adhesion, after drying for an additional 7 days at room temperature.

The diminution of cross linking and increased adhesion can be seen from results shown in Table III.

TABLE III

Wet Adhesion to Gloss Alkyd

| Sample number | Performance rating | Stabilizing acid employed | pH of 2-(1-aziridinyl) ethyl methacrylate solution | pKa | pH of final dispersion |
|---|---|---|---|---|---|

| | | | | | |
|---|---|---|---|---|---|
| I | poor | none | - | - | 7.4 |
| II | fair | none | - | - | 6.7 |
| III | excellent | Phosphoric | 4.25 | 2.12a | 3.15 |
| IV | excellent | Sulfuric | 4.7 | <1.0b 1.92c | 2.75 |
| V | fair | Methacrylic | 6.75 | 4.5 | 4.9 |
| VI | good | Phosphoric | 4.45 | 2.12a | 3.0 | a. Determined from the ionization of first proton.
b. The pKa value for the first proton from sulfuric acid is too low to measure.
c. Determined from the ionization of the second proton.

These data clearly show that films deposited from dispersions prepared with unstabilized or only insufficiently stabilized Aziridine monomer lack the desired wet adhesion.

Example III was repeated five separate times while replacing the 2-(1-aziridinyl) ethyl methacrylate by the same amount of 2-(1-aziridinyl) ethyl acrylate; 3-(1-aziridinyl) propyl methacrylate; 4-(1-aziridinyl) butyl acrylate; 2-[1-(2,3) dimethyl aziridinyl] ethyl methacrylate and 2[1-(2butyl) aziridinyl] ethyl metacrylate, respectively. The ortho phosphoric acid was replaced by different acids (shown in Table IV) in amounts to give a pH between 4 and 5. The dispersion were labeled as samples II to XI inclusive, respectively. The dispersions were separately formulated into finished paints and tested for wet adhesion to gloss alkyd as described above. The results obtained are shown in Table IV.

TABLE IV

| Sample | Wet adhesion performance rating | Stabilizing acid employed | pH of aziridinyl monomer solution |
|---|---|---|---|
| VII | Good | Oxalic | 4.85 |
| VIII | Good | Tartaric | 4.70 |
| IX | Excellent | Toluene sulfonic | 4.00 |
| X | Excellent | Picric | 4.20 |
| XI | Excellent | Dichloroacetic | 4.00 |

EXAMPLE XII

Similar to Example III, all charge remained the same except charge C, i.e., the pre-emulsion charge, was replaced by the following charge:

| | Amount in grams |
|---|---|
| Water (distilled) | 76 |
| Triton X405 | 19.3 |
| Butyl acrylate | 165.0 |
| Hexyl methacrylate | 80.0 |

The final dispersion was formulated into a finished paint as above. The wet adhesion performance rating was excellent.

EXAMPLE XIII

Similar Example III, all charges remained the same except charge C, i.e., the pre-emulsion charge, was replaced by the following:

| | Amount in grams |
|---|---|
| Water (distilled) | 76 |
| Triton X405 | 19.3 |
| Ethyl methacrylate | 245.0 |

The final dispersion was formulated into a finished paint as above. The wet adhesion performance rating was excellent.

We claim:

1. The process of preparing emulsion polymers, the films of which have adhesion to previously painted substrates, which comprises polymerizing in the absence of air and in the presence of a peroxygen type catalyst an aqueous dispersion containing, based on the weight of total monomers, from 80 to 99.9 percent by weight of at least one monomer selected from the class consisting of monoethylenically unsaturated acrylate ester and monoethylenically unsaturated methacrylate ester with an aqueous acid solution of a PKa value of 1.5 to 3.0 and containing 0.1 to 20 percent by weight of an ethylenically unsaturated polymerizable aziridinyl monomer selected from the class consisting of monomers of the following formulas:

(1) 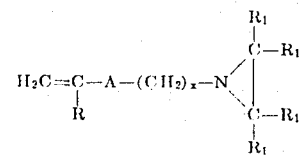

and (2) 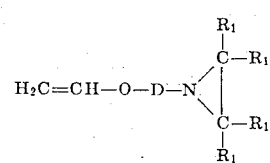

wherein R is hydrogen or methyl, each $R_1$ is independently selected from the group consisting of hydrogen and alkyl group of from one to four carbon atoms, A represents a member selected from the class consisting of

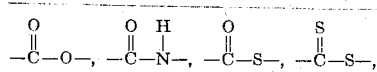

and

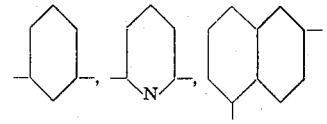

D represents a member selected from the class consisting of

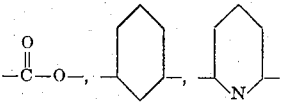

and $(CH_2)_x$ group in which the $x$ and the $x$ informula (1) represent a numeral ranging from 2 to 6.

2. The process of preparing emulsion polymers, the films of which have adhesion to previously painted substrates, which comprises polymerizing in the absence of air and in the presence of a peroxygen type catalyst an aqueous dispersion containing, based on the weight of total monomers, from 80 to 99.9 percent by weight of a mixture consisting of about 1 part by weight of a monoethylenically unsaturated acrylate ester and about 2 parts by weight of a monoethylenically unsaturated methacrylate ester with an aqueous acid solution of a PKa value of 1.5 to 3.0 and containing 0.1 to 20 percent by weight of an ethylenically unsaturated polymerizable aziridinyl monomer selected from the class consisting of monomers of the following formulas:

(1)
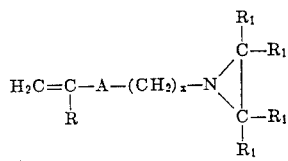

and (2)
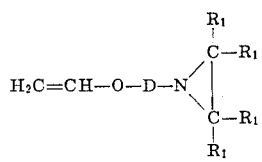

wherein R is hydrogen or methyl, each $R_1$ is independently selected from the group consisting of hydrogen and alkyl group of from one to four carbon atoms, A represents a member selected from the class consisting of

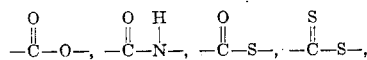
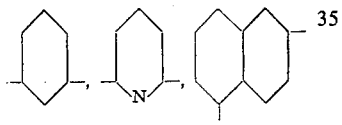

and

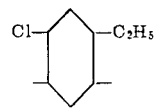

, D represents a member selected from the class consisting of

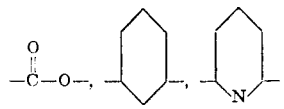

and $(CH_2)_x$ group in which the $x$ and the $x$ in formula (1) represent a numeral ranging from 2 to 6.

3. The process according to claim 1 wherein the aziridinyl monomer is 2-(1-aziridinyl) ethylmethacrylate.

4. The process according to claim 1 wherein the aziridinyl monomer is 3-(1-aziridinyl) propyl methacrylate.

5. The process according to claim 1 wherein the aziridinyl monomer is 2-[1-(2.3) dimethyl aziridinyl] ethyl methacrylate.

6. The process according to claim 1 wherein the aziridinyl monomer is 2[1-(2 butyl) aziridinyl] ethyl methacrylate.

7. The process according to claim 2 wherein the said mixture consists of about 1 part by weight of methyl methacrylate and about 1 part by weight of ethyl acrylate.

* * * * *

UNITED STATES PATENT OFFICE
CERTIFICATE OF CORRECTION

Patent No. 3,719,646          Dated March 6, 1973

Inventor(s) ROBERT STECKLER, ET. AL.

It is certified that error appears in the above-identified patent and that said Letters Patent are hereby corrected as shown below:

On the cover sheet [75], "Robert Stecklen" should read -- Robert Steckler -- .

Signed and sealed this 20th day of November 1973.

(SEAL)
Attest:

EDWARD M. FLETCHER, JR.
Attesting Officer

RENE D. TEGTMEYER
Acting Commissioner of Patents